Aug. 14, 1962 A. D. MILLER 3,049,309
CONTINUOUS LOOP TAPE MECHANISM AND METHOD OF TAPE STORAGE THEREFOR
Filed Nov. 5, 1959
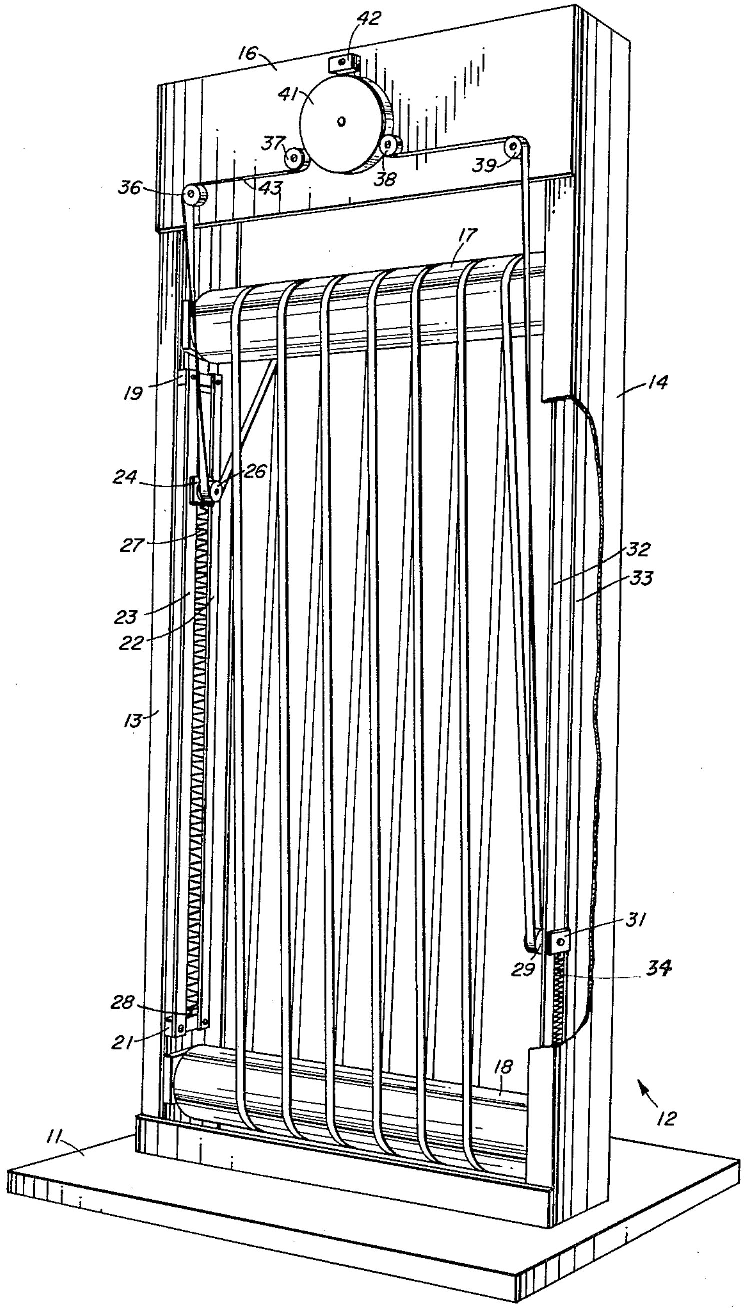
INVENTOR.
ANSEL D. MILLER
BY
Paul A. Fitchlow
ATTORNEYS United States Patent Office 3,049,309

Patented Aug. 14, 1962

3,049,309

CONTINUOUS LOOP TAPE MECHANISM AND METHOD OF TAPE STORAGE THEREFOR

Ansel D. Miller, Chicago, Ill., assignor, by mesne assignments, to the United States of America as represented by the Secretary of the Navy Filed Nov. 5, 1959, Ser. No. 851,204
4 Claims. (Cl. 242—55.01)

This invention relates to magnetic recording and reproducing devices and more particularly to such devices utilizing an endless magnetic tape as a recording medium.

When the storage of messages for readout at a later time was incorporated as a feature of endless tape record-playback devices, there arose the need for quick repositioning of the tape so that that portion of the tape containing the stored message selected for readout could be brought into the operating zone adjacent the record-playback head with a minimum of time delay.

This capability for quickly repositioning the tape has been drastically curtailed by the manner in which the previous devices stored and moved the endless tape. One form of device stores the tape in an endless spiral with a loop of the tape extending from the inner and outer convolutions to the operating zone. This loop interconnecting the innermost and outermost convolutions moves through the operating zone at a given linear rate of speed. The tape must linearly travel throughout its length at this speed whether it is part of an inner or outer convolution. Accordingly, the different convolutions of the coil, since they have different diameters, must move at different angular velocities with respect to one another, the outermost convolution having to move at the greatest angular velocity and the innermost convolution at the least angular velocity. At a result, adjacent successive convolutions must continually slip relative to one another and in doing so build up frictional forces between the adjacent convolutions of the tape. These frictional forces tend to contract and tighten the individual convolutions. The contraction and tightening of each convolution in turn increases the frictional force exerted on adjacent inner convolutions. The result is an accumulative build-up of friction and contraction-tightening. In some instances this may lead to stoppage of the tape's travel or to damage of the tape. It also is a problem to maintain that portion of the operating loop coming off an outer convolution and that coming off an inner convolution in the same degree of tension so as to prevent kinking or snarling or even breakage of the tape. Thus it is apparent that those devices which store the tape in a spiral configuration have an inherent disability as to the effectuation of quick repositioning of the endless tape for readout purposes.

Another group of devices attempts to improve upon repositioning speed capability of the endless loop tape by the incorporation of a tape accumulator or storage bin. In these the tape loop leads from the operating zone through a guideway into a storage compartment where by free fall the tape assumes a serpentine folded configuration. But here, too, we find substantial limitations to the repositioning speed which can be achieved. The tape has a tendency to become fouled due to the fact that accumulated electrostatic charges on the tape cause individual folds of the tape to repel one another. In addition, air trapped beneath the tape slows down its rate of free fall into the bin or accumulator. Also, any slight friction or drag on the tape as it passes through the guideway, which usually is a vertical chute, is likely to impede its movement and may cause a jam. All these factors tend to diminish the repositioning speed capability.

According to the present invention the tape is stored in an elongated progressive winding between a pair of spaced, parallel, free-turning drums which are some distance apart and which serve as guiding members for the tape. The tape, coming from the operating zone, passes over the first drum, then on to the second drum, over it and back again to the first drum to a new position on the first drum which is slightly axially-removed from its original position on the drum. Continuation of this pattern of looping gives the resulting winding a configuration which is somewhat helical in effect since the tape winding progressively travels the length of both drums. The tape enters the drum winding from the operating zone and leaves the drum winding to return to the operating zone to form an endless loop. In the operating zone are standardized driving means for causing the tape to move linearly as well as a standard record-playback transducer. In the path of the tape between the drum winding and the operating zone are positioning and tensioning means for directing the tape between operating zone and drum winding and for maintaining the proper tension components upon the tape. The result is an endless loop tape which is under positive control throughout the length of its travel and which can be very rapidly repositioned for readout or other purposes. The dual drum construction for storage of the tape provides a relatively compact, simple apparatus which avoids the inherent difficulties posed to tape repositioning speed by the spiral and bin storages of the devices previously mentioned.

An object of the present invention is the provision of an improved endless loop tape recording and reproducing device.

An additional object is to provide an endless loop tape record-playback device providing for quick and easy repositioning of the tape thereof.

Another object is the provision of a record-playback device enabling quick readout of stored messages.

A further object is to provide a tape recording and reproducing device wherein positive control is exercised over the tape throughout its travel.

Another object is to provide a method for storing tape in an endless-loop tape record-playback device which allows the tape to be repositioned with a minimum of delay and difficulty.

Still another object is to provide an endless loop tape record-playback device which presents a minimum of possibility for snarling or kinking or breaking of the tape.

An additional object is the provision of an endless loop tape record-playback device wherein the tape is automatically kept under proper tension.

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 1 shows a perspective view of the continuous loop tape mechanism.

Referring now to FIG. 1, mounted on a base 11 is a supporting frame 12, whose portions include uprights 13 and 14 and a cross member 16 between the upper portions of the uprights. Suitably mounted on uprights 13 and 14 for free rotation are a pair of horizontaly disposed drums 17 and 18, one at the upper portion of the frame and the other at the lower portion thereof. Mounted on mounting blocks 19 and 21 on the inner face of upright 13 are a pair of vertically-extending, parallel tracks 22 and 23. Trolley 24 which supports freely-rotatable pulley 26 is constructed for slidable movement in the channelway produced by tracks 22 and 23. The bottom portion of trolley 24 is suitably connected to a resilient spring 27 whose other end is connected at 28 to block 21, the spring 27 resiliently urging trolley 24 with its pulley 26 downwardly. In like fashion, pulley 29 mounted on trolley 31 is resiliently urged downwardly along tracks 32 and 33 by spring 34 along the inner face of upright 14.

Mounted on cross member 16 are suitably positioned freely-rotatable guide rollers 36, 37, 38 and 39, a driving capstan 41 and standard transducer apparatus 42. Driving capstan 41 may be driven at a normal or fast speed and may rotate either clockwise or counter-clockwise. Transducer apparatus 42 consists of conventional record-playback and erase heads so located as to permit recording or readout for either direction of rotation of driving capstan 41.

Tape 43 passes around guide rollers 36 and 37, driving capstan 41 and guide rollers 38 and 39 in the "operating zone" on cross member 16 where it has linear motion imparted to it by driving capstan 41 and is operatively acted upon by transducer apparatus 42. Guide rollers 37 and 38 act to bring tape 43 to bear against driving capstan 41 so that the angular movement of capstan 41 imparts a linear motion to tape 43.

As it leaves the "operating zone" from guide roller 36 tape 43 passes around downwardly biased pulley 26 and then up and around drum 17. After it has made a turn on drum 17 tape 43 then passes down to and around drum 18 and then back to drum 17 to pass over drum 17 along a locus slightly removed from its first locus along the surface of this drum. This winding configuration of tape 43 continues between drums 17 and 18 until tape 43 has run the length of drums 17 and 18, finally coming off drum 17 to pass around downwardly-biased pulley 29 and back up to the "operating zone" to complete the loop.

For the sake of clarity the individual turns of the tape winding have been shown exaggeratedly spaced on drums 17 and 18 in FIG. 1; in practice the turns are more closely grouped. With drums 17 and 18 being substantially spaced from one another a considerable amount of tape can be stored in this winding between drums 17 and 18. As shown in the drawing, tape 43, as it runs back and forth between the drums 17 and 18, forms a winding therebetween which traces a substantially-elongated oblongly helical-like path. The longitudinal axis of this winding formed by tape 43 is parallel to the longitudinal axes of the respective drums 17 and 18 and it will be noted that the winding's larger dimension transverse to this longitudinal axis is many times said winding's smaller dimension transverse to said longitudinal axis. This winding configuration allows a considerable amount of tape to be stored in the widing between drums 17 and 18 and, at the same time, permits very rapid repositioning of the tape 43, as desired.

Downwardly-biased puleys 26 and 29 are so positioned and so biased as to place required tensioning components upon tape 43 both in the winding portion and in the portion in the "operating zone." They further act as shock absorbers when the movement of tape 43 is started or stopped.

It can be seen that by driving capstan 41 at a selected speed the endless loop can be repositioned as desired for recording or readout of a message along a certain portion of the tape with a minimum of delay and difficulty. The capstan can be driven for this repositioning of the tape at a higher speed than would be suitable for recording or playback. Once the tape is repositioned to bring the proper spot on the tape adjacent transducer apparatus 42 the capstan speed can be lowered to meet the recording or playback requirement.

As described the apparatus is shown mounted in a vertical frame, but could equally well be disposed at any given angle.

As shown in FIG. 1, drums 17 and 18 are ungrooved. Another embodiment contemplates the use of suitable grooves on drums 17 and 18 for accommodating the various turns of tape 43.

Obviously many modifications and variations of the present invention are possible in the light of the above teachings. It is therefore to be understood that it is intended to cover all changes and modifications of the invention disclosed herein which do not constitute departures from the spirit and scope of the invention.

What is claimed is:

1. In a magnetic record-playback apparatus comprising an endless-loop magnetic tape, supporting means, selective-speed impelling means mounted on said supporting means for imparting a selected linear motion to said tape, a record-playback transducer mounted on said supporting means for recording intelligence on or for playing back intelligence from said tape at the operator's option, guide means mounted on said supporting means for causing said tape to engage with said impelling means and for carrying said tape past said transducer in close proximity thereto, said impelling means along with said transducer and said guide means defining an operating zone, the improvement comprising means mounted on said supporting means for storing said tape in an elongated, continuous, progressive winding, which substantially follows an oblongly-helical path and which has a three-dimensional configuration wherein said winding's larger dimension transverse to the longitudinal axis of said winding is many times said winding's smaller dimension transverse to said longitudinal axis, means mounted on said supporting means outside of said operating zone for routing said tape into and out of said winding configuration and means mounted on said supporting means for applying suitable tension components on said tape at the limits of its winding path as said tape respectively leaves and enters said operating zone.

2. In a magnetic record-playback apparatus comprising an endless-loop magnetic tape, supporting means, selective-speed impelling means mounted on said supporting means for imparting a selected linear motion to said tape, a record-playback transducer mounted on said supporting means for recording intelligence on or for playing back intelligence from said tape at the operator's option, guide means mounted on said supporting means for causing said tape to engage with said impelilng means and for carrying said tape past said transducer in close proximity thereto, said impelling means along with said transducer and said guide means defining an operating zone, the improvement comprising a pair of freely-rotatable, substantially-spaced, parallel drums of substantially the same length mounted on said supporting means outside of said operating zone, said drums being spaced from one another by a dimension many times the diameter of either of said drums and serving as the guides for forming a continuous, progressive, elongated winding of said tape wherein said tape follows a substantially oblongly-helical path and each turn of said tape is spaced from adjacent turns and guiding-and-tensioning means mounted on said supporting means for guiding said tape between said winding path and said operating zone as said tape enters and leaves said operating zone and for concurrently applying tension to said tape at the beginning and at the end of its winding path as said tape respectively leaves and enters said operating zone.

3. A method for quickly repositioning the endless magnetic tape of a record-playback device in order to bring a specific portion of said tape adjacent the record-playback transducer of said device which comprises storing most of said tape in an elongated, continuous, progressive winding wherein said tape follows a substantially oblongly-helical path and wherein said winding's larger dimension transverse to the longitudinal axis of said winding is many times said winding's smaller dimension transverse to said longitudinal axis, forming the balance of said tape into a loop whose ends define the limits of said winding and which is continuous with said winding, guiding said loop past and in close proximity to said record-playback transducer and linearly impelling said endless tape by driving said tape in its loop portion at selected speed and direction to locate any desired portion of said tape adjacent said record-playback transducer for operative registry therewith, the initial speed of said tape being greater than the readout speed for said tape to enable quick repositioning and the final speed of said tape being at readout speed when an exact point of readout is being located, the initial direction of impulsion of said tape being such as to carry said tape away from the end of the winding closest to the general area of location on said tape of the specific tape portion selected for registry with said record-playback transducer and, when an exact point of readout is being located, the final direction of impulsion of said tape being coincident with the direction in which said tape travelled when the selected portion of said tape was undergoing recording from said record-playback transducer.

4. A method for storing and repositioning the recording tape of a record-playback device, having an endless-loop recording tape, a record-playback transducer and a tape driving mechanism, said record-playback transducer and said tape driving mechanism defining the principal elements of an operating zone of said record-playback device, which comprises storing most of said tape in an elongated continuous progressive winding formed between a pair of widely-spaced freely-rotatable storage drums which support said tape at the lower and upper limits of its winding, said tape in said winding substantially following an oblongly-helical path and said winding having a three-dimensional configuration wherein said winding's larger dimension transverse to the longitudinal axis of said winding is many times said winding's smaller dimension transverse to said longitudinal axis; maintaining the balance of said tape in a loop passing through the operating zone and driving said tape in the operating zone separately from and independently of said freely-rotatable storage drums to bring any desired portion of said tape into quick operative registry with said record-playback transducer; suitably guiding said tape into and out of said winding; and maintaining suitable tension components on said tape at both ends of said winding.

References Cited in the file of this patent

UNITED STATES PATENTS

| | | |
|---|---|---|
| 63,934 | Parker | Apr. 16, 1867 |
| 1,282,006 | Tartt | Oct. 15, 1918 |
| 2,332,717 | Heyer | Oct. 26, 1943 |
| 2,637,560 | Smith | May 5, 1953 |

FOREIGN PATENTS

| | | |
|---|---|---|
| 647,387 | Germany | July 2, 1937 |